W. H. KINGSTON.

MACHINE FOR SETTING LACING HOOKS.

APPLICATION FILED APR. 5, 1909.

Reissued Aug. 27, 1912.

13,461.

3 SHEETS—SHEET 1.

WITNESSES.

Herbert W. Kenway

Elizabeth C. Coupe

INVENTOR

William H. Kingston

By his Attorney

Nelson W. Norland

W. H. KINGSTON.

MACHINE FOR SETTING LACING HOOKS.

APPLICATION FILED APR. 5, 1909.

Reissued Aug. 27, 1912.

13,461.

3 SHEETS—SHEET 2.

WITNESSES.

Hubert W. Kenway.

Elizabeth C. Coyle

INVENTOR.

William H. Kingston

By Lin H. Thomas

Nelson M. Marrand

W. H. KINGSTON.

MACHINE FOR SETTING LACING HOOKS.

APPLICATION FILED APR. 5, 1909.

Reissued Aug. 27, 1912.

13,461.

3 SHEETS—SHEET 3.

WITNESSES.

Herbert W. Kenway

Elizabeth C. Coyle

INVENTOR.

William H. Kingston

By his Attorney,

Nelson W. Howland

UNITED STATES PATENT OFFICE.

WILLIAM H. KINGSTON, OF NEWARK, NEW JERSEY, ASSIGNOR TO UNITED SHOE MACHINERY COMPANY, OF PATERSON, NEW JERSEY, A CORPORATION OF NEW JERSEY.

MACHINE FOR SETTING LACING-HOOKS.

13,461. Specification of Reissued Letters Patent. Reissued Aug. 27, 1912.

Original No. 876,063, dated January 7, 1908, Serial No. 700,487. Application for reissue filed April 5, 1909. Serial No. 488,138.

*To all whom it may concern:*

Be it known that I, WILLIAM H. KINGSTON, a citizen of the United States, residing at Newark, in the county of Essex and State of New Jersey, have invented new and useful Improvements in Machines for Setting Lacing-Hooks, of which the following is a specification.

This invention has for its object to provide a simple and effective machine for setting lacing-hooks; and it consists in the several improvements which I will now proceed to describe and claim.

Figures 1, 2, 3:
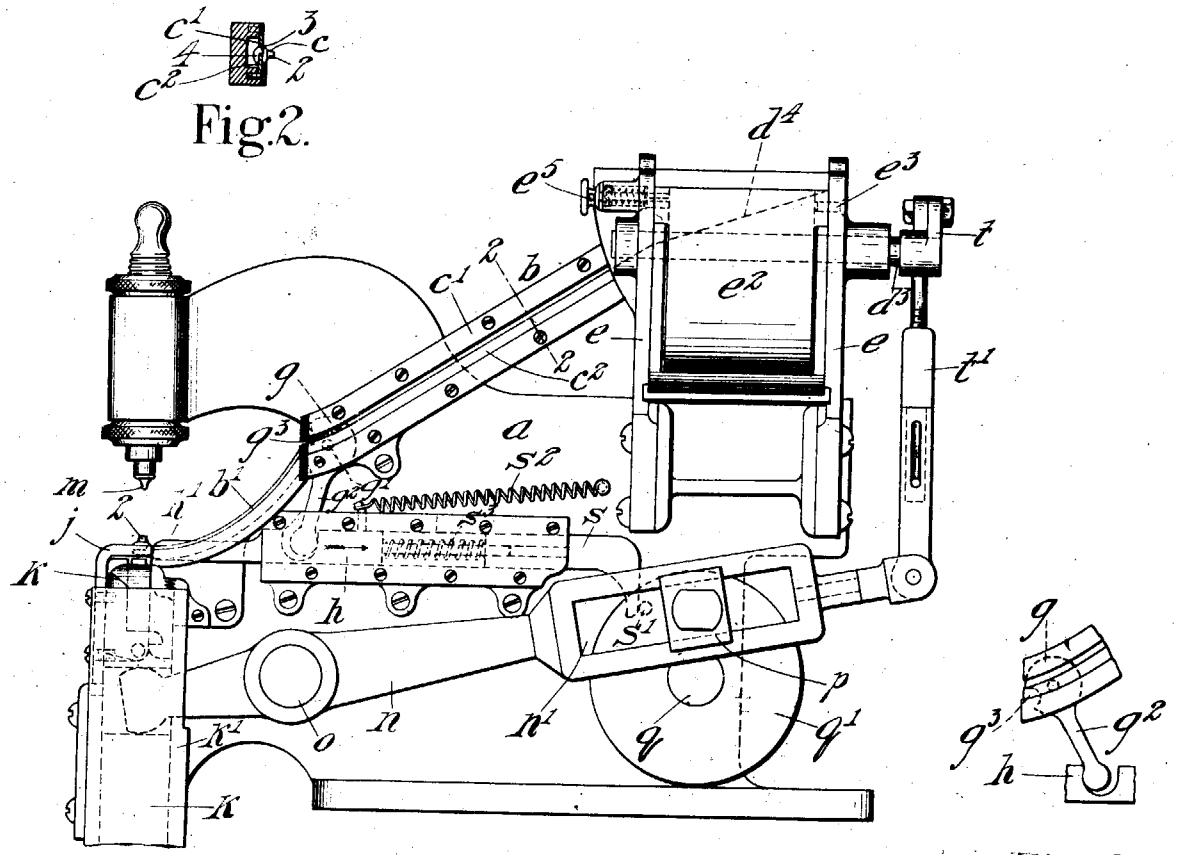
Figure 4:
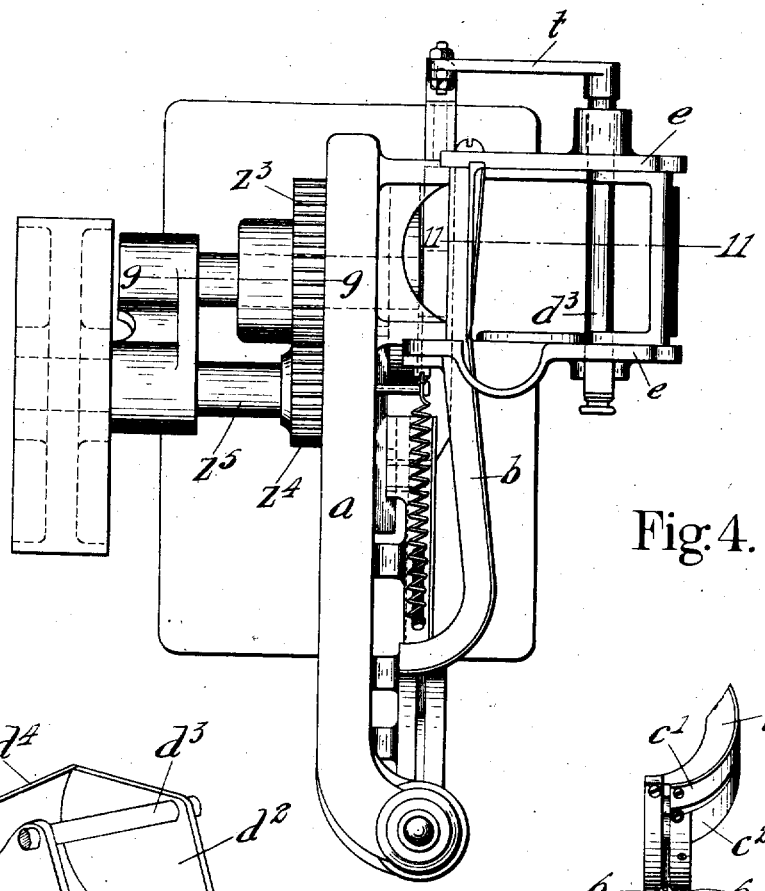
Figure 5:
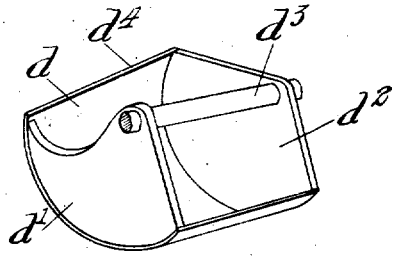
Figure 6:
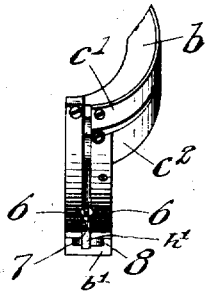
Figure 11:
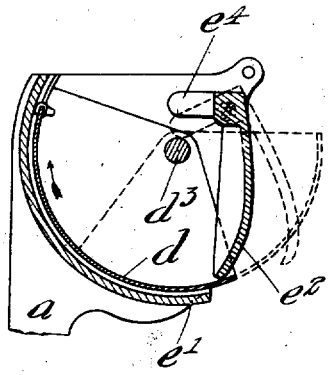
Figure 7:
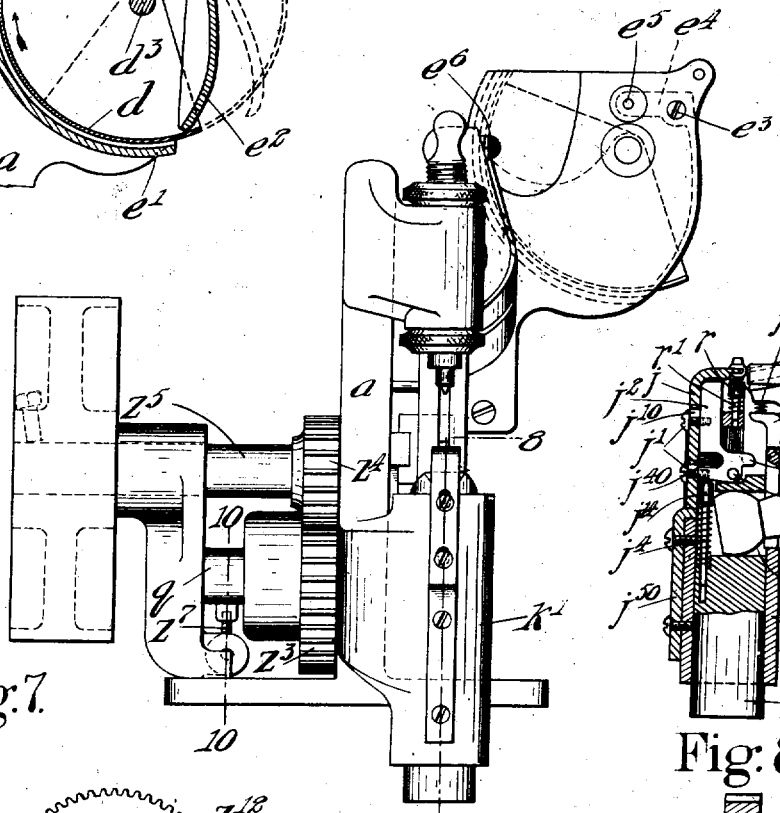
Figure 8:
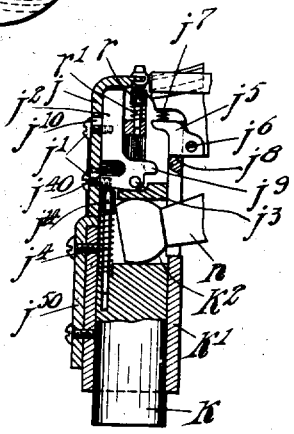
Figure 10:
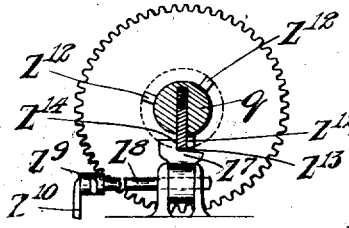
Figure 12:
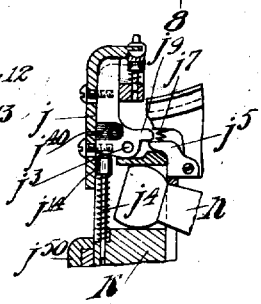
Figure 9:
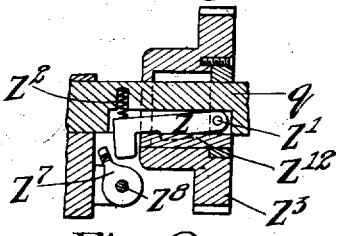

Of the accompanying drawings forming a part of this specification,—Figure 1 represents a side elevation of my improved machine. Fig. 2 represents a section on line 2—2 of Fig. 1. Fig. 3 represents a side view of a portion of the chute and the let-off device therein. Fig. 4 represents a top view of the machine. Fig. 5 represents a perspective view of the device, which separates hooks from the mass in the reservoir, and delivers them to the chute. Fig. 6 represents a front elevation of portions of the chute. Fig. 7 represents a front elevation of the machine. Fig. 8 represents a section on line 8—8 of Fig. 7. Fig. 9 represents a section on line 9—9 of Fig. 4. Fig. 10 represents a section on line 10—10 of Fig. 7. Fig. 11 represents a section on line 11—11 of Fig. 4. Fig. 12 represents a section similar to Fig. 8, with the anvil and carrier in elevated position.

In the drawings, $a$ represents the supporting frame of the machine, which is provided with an inclined chute comprising an upper section $b$ and a lower section $b'$. The section $b$ is formed in cross-section as shown in Fig. 2, and has the side-plates $c'$ $c^2$ separated by the longitudinal slot or passage which receives the neck of a lacing-hook $c$. The head 4 of the hook stands within the plate $c^2$, and the shank or barrel 2 stands outside. At the upper end of the section $b$ is located a hook-reservoir having a separator for delivering lacing-hooks to the chute in the position shown in Fig. 2. Said separator comprises an oscillating curved plate $d$ attached at its ends to arms $d'$ $d^2$, which are affixed to a rock-shaft $d^3$. Said rock-shaft is mounted to oscillate in bearings formed in heads $e$ $e$ affixed to the frame of the machine and forming the ends of the reservoir, which has a cylindrical body $e'$ between said heads. The said body is substantially parallel with the separator-plate $d$, as shown in Fig. 11. The heads $e$ $e$ and the cylindrical body $e'$ constitute the fixed parts of the reservoir in which the separator-plate $d$ oscillates, said reservoir being completed by a movable gate $e^2$ pivotally connected by studs or pivots $e^3$ $e^3$ with the heads $e$ $e$. The gate $e^2$ is provided with arms $e^4$ $e^4$, one of which is engaged by the spring-pressed locking-pin $e^5$ which holds the gate normally in the position shown in Fig. 11, so that it forms a wall coöperating with the fixed parts $e$ $e$ and $e'$ in holding a mass of lacing-hooks above said separator-plate. The gate $e^2$ can be displaced, as shown by dotted lines in Fig. 11, by withdrawing the locking-pin $e^5$ to permit the quick removal of the lacing-hooks in the reservoir when it is desired to change from one style of hooks to another. One of the fixed heads $e$ is provided with an orifice $e^6$ which coincides with the upper end of the plate $c^2$, so that a lacing-hook passing outwardly from the reservoir through the orifice $e^6$ in the position shown in Fig. 2 will engage the plate $c^2$, as shown in said figure. One edge $d^4$ of the separator $d$, which I term the hook-delivering edge, is inclined, as shown in Fig. 4, and said inclined edge is arranged so that when the separator is at one extreme of its oscillating movement, its lower end will register with the upper end of the plate $c^2$, as shown by dotted lines in Fig. 1. The inclination of the hook-delivering edge $d^4$ is such that any lacing-hooks which bestride it in the position shown in Fig. 11 will slide from it to the upper end of the plate $c^2$ when the edge $d^4$ registers with said plate. The separator $d$ is located in such close proximity to the cylindrical body $e'$ of the reservoir, that only the head portions of the lacing-hooks can be inserted in the space between the separator and the reservoir body; consequently when the separator is oscillated, the lacing-hooks can only bestride this edge with their shank portions projecting inwardly, as shown in Fig. 11. It will be seen, therefore, that when the separator is moved in the direction indicated by the arrow in Fig. 11, its inclined edge $d^4$ will collect such hooks as it happens to encounter in the proper position, and that when the edge $d^4$ reaches the upward limit of its movement in the same direction, its lower end registering with the upper end of the plate $c^2$, the said hooks will slide from the inclined edge $d^4$ to the plate $c^2$, and will therefore slide down the chute.

In Fig. 11 the position of the separator at one extremity of its oscillation is indicated by solid lines, this position being that in which its front or inclined edge is in position to discharge the hooks to the plate $c^2$. In said figure the position of the separator when at the other or rear extremity of its oscillation, is indicated by dotted lines. It will also be seen by reference to said figure, that the distance between the front and rear edges of the separator is greater than the distance between its extremes of oscillation and therefore neither edge of the separator has extensive movement as an advancing edge among the mass of hooks in the reservoir, which movement might have a tendency to damage the hooks or the edge of the separator. In other words, although the separator is an oscillating one, neither edge has a movement among the hooks that might cause damage. It will readily be understood furthermore, that if any hooks become caught on the delivering edge and fail to slide therefrom onto the plate $c^2$, they will be dislodged by the next backward movement of the delivering edge among the hooks in the reservoir.

The section $b$ of the chute is given a quarter-turn at its lower end, and there delivers the hooks supplied to it, to the section $b'$, which comprises two curved plates or flanges 6 6, which are horizontal in their cross-section and are separated by a slot 7 of sufficient width to receive the neck 3 of the lacing-hook, the section $b'$ having a passage 8 under the flanges 6, of suitable width to receive the outer portion or head of a lacing-hook. The section $b'$ delivers the hooks in the position shown in Fig. 1, the hooks being given this position by their passage from the section $b$ to the section $b'$ and their passage along the latter section. A transferring device is located at the lower portion of the section $b$, to transfer lacing-hooks, one at a time, to the section $b'$. Said transferring device comprises a plate $g$ pivoted at $g'$ and having an arm $g^2$ which is engaged by a reciprocating slide $h$ hereinafter referred to. The plate $g$ has a recess $g^3$ formed to receive the head of the lowest lacing-hook in the section $b$ when the plate $g$ is in the position shown in Fig. 1. When said plate is moved to the position shown in Fig. 3, it forces the hook into the section $b'$.

The curvature of the section $b'$ is such that gravitation is not sufficient to carry the hooks to the lower end of said chute, the hooks stopping before they reach said lower end. The slide $h$ is provided with a projecting arm or ejector $h'$, which enters the lower portions of the section $b'$ and ejects therefrom each hook that is deposited therein by the action of the let-off device $g$. The ejector $h'$ forces each hook forward to and upon an anvil-plate $j$, which is mounted upon a vertically movable plunger carrier $k$ sliding in a fixed guide $k'$ attached to the frame of the machine, the said carrier being reciprocated to a sufficient extent to present the tubular shank 2 of each hook to an upsetting die $m$ mounted on a fixed overhanging arm on the upper portion of the frame $a$.

The anvil-carrier $k$ is reciprocated vertically in the guide or casing $k'$ by means of a lever $n$ pivoted at $o$ to the frame of the machine. One arm of said lever (the shorter) enters a slot $k^2$ in the carrier $k$. The other and longer arm of the lever has a slot $n'$, which receives a block $p$ pivoted eccentrically to a disk $q'$ on the shaft $q$. The rotation of said shaft oscillates the lever $n$ and causes it to reciprocate the carrier $k$.

The anvil $j$ is secured by screws $j'$ to a holder $j^2$, which is pivoted at $j^3$ to the carrier $k$ and is adapted to swing outwardly from the carrier, with the anvil, to withdraw the anvil from each lacing-hook after it has been attached. The holder $j^2$ is normally held in the position shown in Figs. 1 and 8, by a spring $j^4$ acting on a plunger $j^{14}$ which bears on the holder, and is displaced against the pressure of said spring after each ascent of the carrier, by means of a catch $j^5$ pivoted at $j^6$ to the frame of the machine and adapted to yield upwardly against the stress of a spring $j^7$, but held rigidly by a stop-shoulder $j^8$ against downward movement from the position shown in Fig. 8. When the carrier $k$ rises, a lug $j^9$ on the anvil-holder $j^2$ strikes the catch $j^5$, which yields upwardly until the lug passes above it, and then springs back under the lug. When the carrier $k$ descends, the catch standing in the path of the lug $j^9$ forces the latter, with the holder $j^2$ and anvil $j$, outwardly, thus removing the anvil from the hook last attached, so that the work can be readily moved along preparatory to the attachment of another hook. The anvil is adapted to slide or yield vertically to a slight extent on its holder $j^2$, by means of slots $j^{10}$ through which the screws $j'$ pass, and a spring $j^{40}$ which normally holds the anvil slightly above the upper end of the holder. A stop $j^{50}$ acts as an abutment for the lower end of the anvil $j$ when the latter is in the position shown in Fig. 8, to prevent said anvil from being oscillated on the pivot $j^3$ when the ejector $h'$ is forcing a hook on to the anvil. Said stop also serves to hold the anvil positively in raised position relatively to the carrier $k$ so as to leave a space between the underside of the toe of the anvil and the top of the clamp $r$ presently described, when the carrier is moved to its hook receiving position, so that said clamp will not interfere with the placing of the hook on the anvil.

$r$ represents a clamp yieldingly supported below the anvil $j$ by a spring $r'$, said spring and clamp being sustained by the carrier $k$. The clamp $r$ bears on the head of the hook that is being inserted in the work, when the anvil is caused to yield downwardly by the pressure of the tube of the hook against the die $m$ during the setting operation. The clamp is formed to fit the head of the hook, and prevents the hook from slipping on the anvil during the setting operation.

The slide $h$ that operates the cut-off device $g$ and ejector $h'$ is projected or moved to the position shown in Fig. 1, by means of a sliding arm $s$ arranged to be moved by an eccentric pin $s'$ on the disk $q'$, and is retracted by a spring $s^2$ after the pin $s'$ releases the arm $s$. The slide $h$ is yieldingly connected to the arm $s$ through an interposed spring $s^3$, so that the ejector $h'$ is adapted to yield in case a hook becomes caught or wedged in the chute, damage to the hook, chute, and ejector being thus prevented.

The separator $d$ is oscillated by means of a crank-arm $t$ affixed to the shaft $d^3$, and a rod $t'$ connecting said arm with the lever $n$.

Operation: The hook-separator $d$ is oscillated as described, and delivers to the chute the hooks that collect on its inclined edge $d^4$. The hooks accumulate in the section $b$ of the chute, and are transferred, one at a time, to the section $b'$ by the oscillating plate $g$. The liberated hook slides down the section $b'$ while the ejector is being retracted, said hook being delivered in front of the ejector, and is moved forward by the ejector when the latter is again projected. The carrier $k$ and anvil $j$ are depressed when the ejector is projected, so that the ejector forces the hook onto the anvil, as shown in Fig. 1. The ejector is retracted by the spring $s^2$, before the carrier $k$ and anvil $j$ rise to present the hook to the setting-die. The anvil is raised after the retraction of the ejector, and is swung outwardly by the catch $j^5$, just as it begins to descend.

The described mechanism is timed so that each complete rotation of the shaft $q$ first projects the ejector, then raises the anvil (the ejector being released and retracted before the anvil rises), and then depresses the anvil. An automatic stop-motion is provided, which arrests the motion of the shaft after each complete rotation, while the anvil is depressed and the ejector retracted. Said stop-motion may be of any suitable construction and is preferably constructed as shown in Figs. 9 and 10, in which I show a latch $z$ pivoted at $z'$ to the shaft $q$ and normally thrown outward by a spring $z^2$ to engage shoulders $z^{12}$ in the hub of a gear $z^3$ which is loose on the shaft $q$ and meshes with a gear $z^4$ (see Fig. 4) affixed to the driving-shaft $z^5$. $z^7$ represents a cam-shaped stop, which is affixed to a rock-shaft $z^8$ having a crank-arm $z^9$ connected by a rod $z^{10}$ with a treadle (not shown). The stop $z^7$ stands normally in the path of the latch $z$, as shown in Figs. 7 and 10, and when it enters said path its cam portion $z^{13}$ swings the latch inwardly, out of engagement with the shoulder in the gear $z^3$ and its stop portion $z^{14}$ arrests said latch and with it the shaft. When the stop is moved out of the path of the latch, as shown in Fig. 9, by the depression of the treadle, the latch engages one of the shoulders $z^{12}$, and thus engages the shaft $q$ with the continuously rotating gear $z^3$.

Having described my invention what I claim as new and desire to secure by Letters Patent of the United States is:—

1. A machine of the character specified, comprising a hook-guiding chute, a hook-reservoir communicating with the upper end of the chute and having a curved wall, and a hook-separator mounted to oscillate in said reservoir and conforming to said wall and adjacent thereto and having a hook-delivering edge inclined downwardly, the lower end of which edge registers with the chute when the separator is at one extreme of its movement, the distance between the front and rear edges of said separator being greater than the distance between its extremes of oscillation.

2. A machine of the character specified, comprising a hook-guiding chute, a hook-reservoir having a cylindrical body portion and heads at the ends thereof, and a curved hook-separator mounted to oscillate in said reservoir and having a hook-delivering edge inclined downwardly, said separator being located in close proximity to and substantially parallel with the cylindrical body portion of the reservoir, the distance between the front and rear edges of said separator being greater than the distance between its extremes of oscillation.

3. A machine of the character specified, comprising a hook-guiding chute, a hook-reservoir having a cylindrical body portion and heads at the ends thereof, a rock-shaft journaled in said heads, arms attached to said shaft, and a curved hook-separator attached to said arms and having a hook-delivering edge inclined downwardly, said separator being substantially parallel with and in close proximity to the cylindrical body of the reservoir, and the distance between the front and rear edges of said separator being greater than the distance between its extremes of oscillation.

4. A machine of the character specified, comprising a reservoir composed of a cylindrical body, heads at the ends thereof, a movable gate forming one side of the rservoir and separated from the cylindrical body by a longitudinal opening, and a hook-separator mounted to oscillate in the reservoir and in said slit, said separator having an inclined hook-delivering edge.

5. A machine of the character specified, comprising a reservoir composed of a curved body, heads at the ends thereof, a gate hinged at its upper portion to said heads and having its ends and lower edge separated by openings from the heads and curved body, a locking device to retain said gate in its operative position, a rock-shaft journaled in said heads, arms on said rock-shaft arranged to oscillate in the openings at the ends of the gate, and a curved hook-separator affixed to said arms and arranged to oscillate in the opening at the lower edge of the gate, said separator being substantially parallel with the curved body of the reservoir and having an inclined hook-delivering edge.

6. In a machine of the character specified, the combination of a chute, a setting-die adjacent to the lower end of the chute, a reciprocating carrier movable toward and from the setting-die, an anvil yieldingly mounted on the carrier and normally raised above the latter by spring pressure, and a hook-clamp yieldingly mounted below the anvil.

7. In a machine of the character specified, the combination of a hook-reservoir, a chute leading therefrom, a hook-separator therein, a setting-die adjacent to the lower end of the chute, an anvil movable toward and from the setting-die, an ejector movable in the chute, a shaft having an automatic stop-motion, connections between the shaft and ejector whereby the latter is projected, an ejector-retracting spring, a lever oscillated by said shaft, and connections between the lever and the anvil and hook-separator.

8. In a hook-setting machine, a carrier, an anvil-plate movably mounted thereon and located at one end thereof, means for normally maintaining said anvil-plate spaced above said carrier to receive freely the throat of the hook, means for moving the anvil-plate outwardly after the hook has been set, and a yielding clamp mounted below said anvil-plate, independently thereof, and being adapted to engage the head of the hook during the setting operation.

9. In a hook setting machine, a carrier having an anvil plate mounted thereon, a spring pressed hook clamping device arranged beneath said anvil plate, means for maintaining said clamping device and said anvil plate separated while a hook is being moved to and upon said plate, said plate and clamping device being relatively movable toward each other after the hook has been seated upon said plate to engage the head of the hook and being separated to permit the clenched hook and anvil plate to be disengaged.

10. In a hook setting machine, an upsetting die, a movable carrier, a chute for supplying the carrier with hooks, said carrier comprising a portion having vertical movement only and an anvil plate constructed and arranged to move vertically with said portion and also transversely with respect thereto, and a yielding clamp mounted in the vertically movable portion of the carrier, partaking of its vertical movement but being independent of the transverse movement of the anvil plate and being adapted to engage the head of a hook on the anvil plate and hold the hook during the setting operation.

11. In a hook-setting machine, a movable carrier, an anvil movably mounted upon said carrier and movable into hook-receiving position, a yielding clamp mounted in the carrier in position to be out of engagement with a hook received upon said anvil when said anvil is in hook-receiving position and in line with the longitudinal axis of the hook delivered to the anvil, and means whereby engagement between said clamp and the top of the hook occurs after said anvil is moved from hook-receiving position.

In testimony whereof I have signed my name to the specification in the presence of two subscribing witnesses.

WILLIAM H. KINGSTON.

Witnesses:
RICHARD S. THNAN,
IRENE MARSELLA.

Copies of this patent may be obtained for five cents each, by addressing the "Commissioner of Patents. Washington, D. C."